US007493469B2

(12) United States Patent
Shichiku et al.

(10) Patent No.: US 7,493,469 B2
(45) Date of Patent: Feb. 17, 2009

(54) PERFORMANCE EVALUATION APPARATUS, PERFORMANCE EVALUATION METHOD, PROGRAM AND COMPUTER READABLE RECORDING MEDIUM

(75) Inventors: Ricardo T. Shichiku, Kashihara (JP); Shinichi Yoshida, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 719 days.

(21) Appl. No.: 11/078,422

(22) Filed: Mar. 14, 2005

(65) Prior Publication Data

US 2005/0201288 A1 Sep. 15, 2005

(30) Foreign Application Priority Data

Mar. 15, 2004 (JP) ............... 2004-072870

(51) Int. Cl.
*G06F 15/00* (2006.01)
*G06F 9/30* (2006.01)
*G06F 12/00* (2006.01)
*G06F 9/26* (2006.01)

(52) U.S. Cl. .............. 712/25; 712/214; 712/201; 712/27; 712/26; 712/25; 711/5; 711/220

(58) Field of Classification Search .......... 712/1, 712/25, 5, 26, 27, 201
See application file for complete search history.

(56) References Cited

U.S. PATENT DOCUMENTS

| 5,021,947 | A | * | 6/1991 | Campbell et al. ............ 712/25 |
| 5,327,569 | A | * | 7/1994 | Shima et al. ................ 712/26 |
| 5,369,774 | A | * | 11/1994 | Hatakeyama ................ 712/25 |
| 5,369,775 | A | * | 11/1994 | Yamasaki et al. ............ 712/25 |
| 5,404,553 | A | * | 4/1995 | Komori et al. ............... 712/25 |
| 5,577,256 | A | * | 11/1996 | Muramatsu et al. .......... 712/27 |
| 5,586,281 | A | * | 12/1996 | Miyama et al. ............... 711/5 |
| 5,918,063 | A | * | 6/1999 | Miyama et al. ............... 712/25 |
| 6,823,443 | B2 | * | 11/2004 | Horiyama et al. ........... 712/201 |
| 6,941,448 | B2 | * | 9/2005 | Kamitani ..................... 712/25 |
| 2001/0044890 | A1 | * | 11/2001 | Horiyama et al. ............ 712/25 |
| 2003/0011710 | A1 | * | 1/2003 | Kameda et al. ............. 348/553 |
| 2005/0102490 | A1 | * | 5/2005 | Itoh et al. .................... 712/25 |
| 2005/0201288 | A1 | * | 9/2005 | Shichiku et al. ............ 370/235 |

FOREIGN PATENT DOCUMENTS

JP    2-275595 A    11/1990

OTHER PUBLICATIONS

"Super-Integrated Data-Driven Processor Realizing Hyper-Distributed System Environment", T. Muramatsu et al., PDPTA '98 International Conference, pp. 461-468, 1998.

* cited by examiner

*Primary Examiner*—Len Tran
*Assistant Examiner*—Maxwell A Clark
(74) *Attorney, Agent, or Firm*—Birch, Stewart, Kolasch & Birch, LLP (57) ABSTRACT

From an application program described in the form of a flow graph, input and output arcs are extracted. Packet rates on the input and output arcs are extracted, and it is determined whether the packet rates of the input arc and the output arc are lower than an upper-limit value of a pipeline transfer rate of a processor element. Based on the determination result, it is determined whether it is possible to execute the described flow graph program in the processor element. Performance evaluation of a program to be executed by a data driven processor based on an asynchronous pipeline transfer control can be carried out with ease and in a short time.

4 Claims, 7 Drawing Sheets

PERFORMANCE EVALUATION APPARATUS, PERFORMANCE EVALUATION METHOD, PROGRAM AND COMPUTER READABLE RECORDING MEDIUM

This nonprovisional application is based on Japanese Patent Application No. 2004-072870 filed with the Japan Patent Office on Mar. 15, 2004, the entire contents of which are hereby incorporated by reference.

BACKGROUND OF THE INVENTION

1. Field of the Invention

The present invention relates to an apparatus and method for evaluating performance of a data processing unit, and more particularly to an apparatus, method, and program for implementing the method, for evaluating a static performance of a program that is executed on an asynchronous pipeline data processing unit based on a data driven architecture.

2. Description of the Background Art

To process a large volume of data at high speed, parallel processing is effective. One of architectures suitable for such parallel processing is a data driven architecture. In an information processing system based on the data driven architecture, processing proceeds in parallel according to a rule that a certain operational processing is not performed before all the input data necessary for the operational processing are prepared and a resource such as an operation unit necessary for the operational processing is assigned.

A configuration of such a data driven-base processing unit is shown, for example, in PDPTA '98 International Conference, "Super-Integrated Data-Driven Processor Realizing Hyper-Distributed System Environment", Muramatsu et al., 1998, pp. 461-468. The Muramatsu document describes a self-synchronous or asynchronous transfer system in which packet transfer between pipeline stages within the data driven processing unit is carried out in accordance with a handshake scheme. The document verifies that processing performance depends on a flow rate of the packets being transferred via the pipeline stages. In the packet transfer, if a filling rate of the pipeline stages is less than a certain value, the packet transfer rate is improved as the number of input data packets increases. When the filling rate of the pipeline stages attains a certain value, the packet transfer rate comes to a maximum. As the number of input packets further increases beyond the certain value, the packet transfer rate decreases due to overflow of the pipeline.

While Muramatsu verifies that maximum processing performance is obtained when the filling rate of the pipeline stages is at a certain value, he is silent on the time required for system evaluation and others.

In the Muramatsu document, a plurality of data driven processors are provided in parallel to achieve parallel processing. As such a multiprocessor system with a plurality of processors involved, a data driven processing unit having, e.g., ten or more processor elements integrated therein is assumed for executing audio signal processing, for example. Here, the processor element corresponds to a unit data driven processing device.

In the case of an application flow graph representing an audio signal processing program, thousands of nodes are assigned to the data driven processing unit, and data are input at a constant rate. In the data driven processing unit, if data (packets) are input at a rate exceeding an input rate processible at each processor element, the pipeline overflows and the processing is stopped. Thus, it is necessary to provide a measure for verifying a data rate of input data acceptable to the data driven processing unit of the multiprocessor.

A synchronous processor, which performs processing based on an external clock signal, has its processing performance dominated by the external system clock. Thus, the input rate of the data acceptable to a program executed on the processor is obvious. In contrast, in the case of an asynchronous or self-synchronous pipeline processor, there is no external system clock signal, and its operation speed is not governed by the clock signal. Thus, it is difficult to predict the rate of the data stream acceptable to the program under execution.

Conventionally, a simulator of high accuracy guaranteeing the operation speed has been used to verify the operation experimentally by changing input intervals of the input data stream, for determining the rate of the input data stream processible by the processor. The execution speed of such a simulator of high accuracy is not at a practically satisfactory level, and evaluation of the data input rate requires a long period of time. There has been a demand for a simple evaluation technique that can evaluate a data transfer rate in a short period of time.

SUMMARY OF THE INVENTION

An object of the present invention is to provide a technique that enables evaluation of a data transfer rate in a short period of time.

A performance evaluation apparatus according to a first aspect of the present invention is an apparatus for evaluating performance of a data driven processing unit that includes a firing control portion for detecting and outputting an executable packet and a program storage portion for storing an execution program and transfers packets according to an asynchronous pipeline transfer control scheme. The apparatus of the first aspect includes: a comparison section for comparing a larger one out of an input packet flow rate of the firing control portion and an output packet flow rate of the program storage portion with a packet transfer rate executable in the data driven processing unit; and an evaluation section for evaluating an input data rate to the data driven processing unit, based on the comparison result by the comparison section.

A method of evaluating performance according to a second aspect of the present invention includes the steps of: for a node connected to an input arc and an output arc of a program executed by a data driven processing unit that transfers packets according to an asynchronous pipeline transfer control scheme, comparing at least one of a packet input rate and a packet output rate with a packet transfer rate executable in the data driven processing unit; and evaluating an input data rate to the data driven processing unit based on the comparison result in the step of comparing.

A program according to a third aspect of the present invention is a program for causing a computer to execute the performance evaluation method according to the second aspect.

A computer readable recording medium according to a fourth aspect of the present invention is a recording medium for storing the program according to the third aspect.

In a data driven processing unit based on an asynchronous pipeline transfer control, a program to be executed on the data driven processing unit is analyzed prior to execution or simulation of the program, and an input data rate acceptable to the data driven processing unit is evaluated. Accordingly, static performance of an application program to be executed on a data driven processing unit of a pipeline transfer control base is evaluated. Specifically, unlike the conventional approach where an acceptable data rate of input data is determined through simulation of a flow graph describing the application program, the flow graph itself is analyzed, and the data rate acceptable to the data driven processing unit is derived from an upper-limit value of a transfer rate through pipeline stages within a processor element in the data driven processing unit. Accordingly, it is possible to effect performance evaluation of an input data rate of a data driven processing unit in a short period of time.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Prior to description of a technique to evaluate performance of an application program according to the present invention, a construction of a processing unit executing the application program will now be described in brief.

Figure 1:
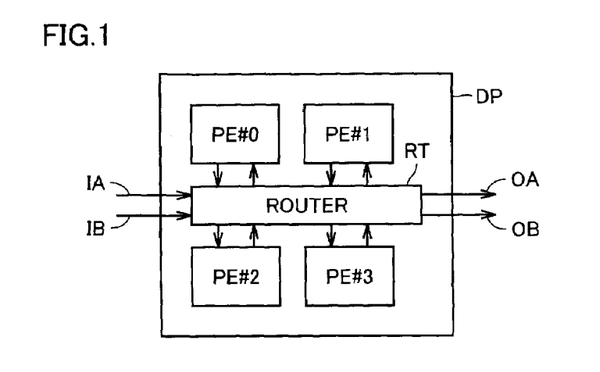
FIG. 1 schematically shows a configuration of a data driven processor including a plurality of processor elements.

FIG. 1 shows an example of a construction of a data driven processor DP of a multiprocessor. Data driven processor DP includes a plurality of processor elements PE#0-PE#3. Processor elements PE#0-PE#3 each have the same configuration, and perform processing while transferring packets asynchronously or self-synchronously manner based on a data driven architecture. Processor elements PE#0-PE#3 are coupled to a router RT, and send and receive data (packets) via the router. Router RT is coupled to input ports IA, IB and output ports OA, OB. Data packets are inputted (accepted) in time series via input port IA or IB, and router RT distributes the input packets based on the numbers that are included in the input packets identify the processor elements. Data packets processed by processor elements PE#0-PE#3 are transferred via router RT and via output port OA or OB.

Processor elements PE#0-PE#3 each store preset processing contents based on an application program, and perform processing according to the stored contents in a data driven architecture base.

Figure 2:
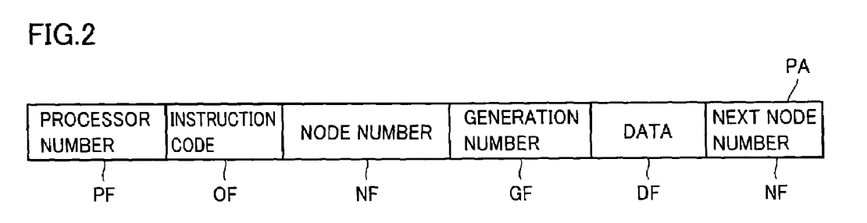
FIG. 2 shows by way of example a configuration of a packet supplied to a processor element.

FIG. 2 shows an example of a structure of a packet PA that is transferred to processor elements PE#0-PE#3. Referring to FIG. 2, packet PA includes a field PF for storing a processor number specifying a processor element, a field OF for storing an instruction code indicating an operation content to be executed, a field NF for storing a node number, a field GF for storing a generation number indicating an order in input time series, a field DF for storing data (operand data) to be processed, and a field NF for storing a next node number indicating a following destination node.

In router RT, a corresponding processor element is selected based on processor number in the field PF, and the associated data packet PA is transferred to the identified processor. As to an instruction code to be stored in field OF in the structure of packet PA shown in FIG. 2, the node number stored in node number field NF of the input packet PA may be referenced at processor elements PE#0-PE#3, for retrieving a corresponding instruction code from a program storage portion as will be described later, to add the retrieved instruction code in field OF of the packet before being transferred within the corresponding processor element.

Figure 3:
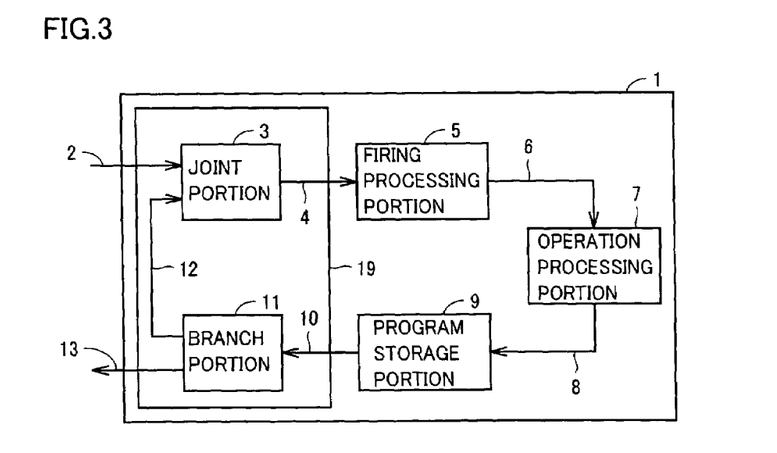
FIG. 3 schematically shows a configuration of a unit data driven processor constituting the processor element shown in FIG. 1.

FIG. 3 schematically shows an example of a construction of processor elements PE#0-PE#3. Processor elements PE#0-PE#3 each have the same construction. They are referred to as a data driven processor also in the case where they are each used alone. In FIG. 3, a reference character 1 denotes a unit data driven processor (processor element).

Referring to FIG. 3, data driven processor 1 corresponding to a processor element includes a joint/branch portion 19 for controlling a packet transfer path, a firing processing portion 5 receiving packets from joint/branch portion 19, for detecting a packet satisfying a firing condition and transferring a fired packet via a pipeline transmission path 6, an operation processing portion 7 receiving the packet transferred from firing processing portion 5, for performing a necessary operation on operand data in accordance with the instruction code included in the received packet and outputting the resultant packet, and a program storage portion 9 receiving the packet transferred from operation processing portion 7 via a pipeline data transmission path 8, for reading a next node number and a corresponding instruction code from an internally provided program memory in accordance with the next node number included in the received packet, storing them in the node number field, the next node number field and the instruction code field, respectively, and transferring the resultant packet to joint/branch portion 19.

Joint/branch portion 19 includes a branch portion 11 that receives the packet transmitted from program storage portion 9 via a pipeline data transfer path 10 and transfers the received packet via an output data transmission path 13 or an internal pipeline data transmission path 12 in accordance with its destination information (node number and processor number), and a joint portion 3 that receives the data packet from branch portion 11 and data packets supplied from an input data transmission path 2, and sequentially transmits the received packets via a data transmission path 4 to firing processing portion 5.

In the case where the construction shown in FIG. 1 is employed, input data transmission path 2 and output data transmission path 13 are both connected to router RT.

Firing processing portion 5 detects two data packets coincident in node number and generation number from the received data packets, and upon arrival of these packets, deems that the packet firing condition is satisfied, to add operand data of one packet of the packet pair to a data field of the other packet and erase the one packet, for transferring the newly generated packet to operation processing portion 7. This processing is made when the operation contents of the packet is a binomial operation instruction. In the case of an operation instruction for three terms or more, a firing condition is deemed being satisfied upon arrival of all the packets for a node where the operation is to be executed, and the process of generating a new packet is performed. In the case of an operation of packet PA with constant data, firing processing portion 5 simply reads corresponding constant data from an internally provided constant data memory, generates a new packet with the read constant data added to data field DF, and transfers the generated packet to operation processing portion 7.

In data driven processor 1, when a queuing memory included in firing processing portion 5 cannot store the received packet, the packet of a non-fired state is made to circulate through pipeline data transmission paths 4, 6, 8, 10, and 12 until there occurs an empty location in the queuing memory.

When a new packet is to be generated in accordance with the packets received from operation processing unit 7 and has two or more packet destinations, a plurality of packets are generated by program storage portion 9 through copying processing, and are transferred to branch portion 11. In this data driven processor 1, packets are asynchronously transferred through the data transmission paths according to a handshake scheme.

Figure 4:
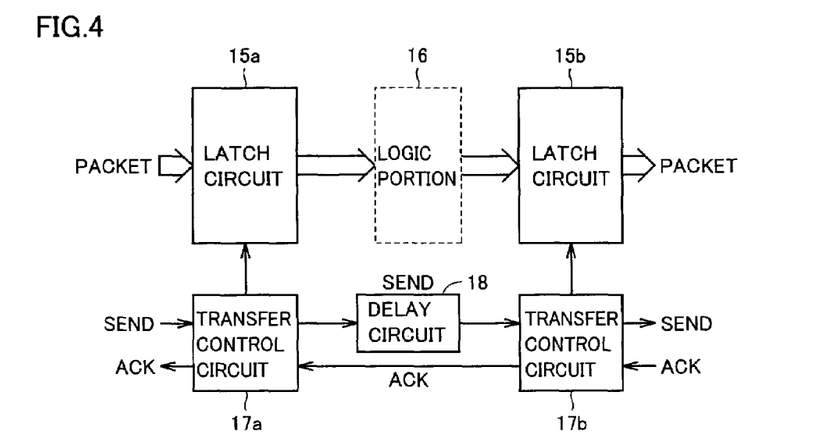
FIG. 4 schematically shows by way of example a construction of a pipeline data transfer path within the processor element shown in FIG. 3.

FIG. 4 shows an example of a pipeline structure of the data transmission paths in data driven processor 1. Referring to FIG. 4, lath circuits 15*a* and 15*b* are arranged on input and output sides, respectively, of a logic portion 16 that performs predetermined processing. Transfer control circuits 17*a* and 17*b* are arranged corresponding to latch circuits 15*a* and 15*b*, respectively. In data (packet) transfer, each of transfer control circuits 17*a* and 17*b* sends a send designation signal SEND designating data transfer to a circuit at the subsequent stage of the pipeline stages. When data can be accepted at the subsequent stage, a data transfer acknowledgement signal ACK is sent to a transfer control circuit at the preceding stage.

A delay circuit 18 is provided corresponding to logic portion 16. Delay circuit 18 compensates for a delay in data (packet) transfer due to the processing time of logic circuit 16.

Logic circuit 16 corresponds to a portion that is provided within data driven processor 1 shown in FIG. 3, and receives transferred packets and performs a processing thereon. Specifically, logic circuit 16 is any one of joint portion 3, firing processing portion 5, operation processing portion 7, program storage portion 9, and branch portion 11 shown in FIG. 3.

Figure 5:
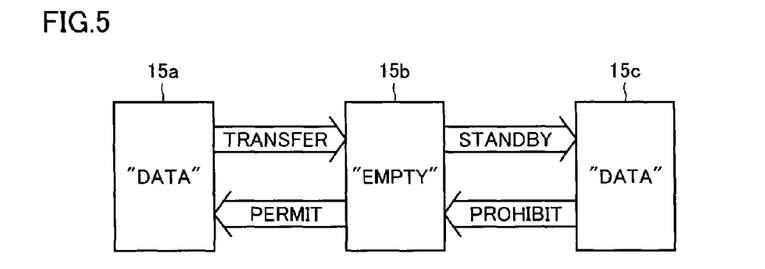
FIG. 5 shows a data packet transferring operation on the pipeline data transfer path shown in FIG. 4.

A packet transferring operation in the pipeline structure shown in FIG. 4 is now described with reference to FIG. 5. FIG. 5 shows the structure where a latch circuit 15*c* is arranged at a stage downstream to latch circuit 15*b*. When there exist meaningful data (before being processed) in latch circuits 15*a* and 15*c*, latch circuits 15*c* and 15*a* each maintain transfer acknowledgement signal ACK in a deasserted state, to prohibit data (packet) transfer. Thus, in this state, data (packet) transfer from latch circuit 15*b* to latch circuit 15*c* is in a standby state.

Latch circuit 15*b* having transferred data (packet) to its corresponding logic portion is in an empty state, and thus, it asserts data transfer acknowledgement signal ACK and signals latch circuit 15*a* at the preceding stage of data transfer permission. At this time, latch circuit 15*a* stores data available for transfer, and transfers the data (packet) to logic portion 16 in accordance with the transfer permission, and simultaneously asserts send designation signal SEND.

When transfer control circuit 17*b* receives send designation signal SEND of the asserted state via delay circuit 18 after assertion of send acknowledgement signal ACK, it causes the corresponding latch circuit 15*b* to perform a latch operation for latching the data (packet) transferred from logic portion 16.

Latch circuits 15*a* and 15*b* each include latch circuits arranged in a first-in first-out (FIFO) fashion, and can transfer of packets in a prescribed order within data driven processor 1.

Packet transfer control may be such that send designation signal SEND is output as a send request when a latch circuit stores data available for transfer, and send acknowledgement signal ACK is asserted when a latch circuit at the subsequent stage becomes ready to accept the data, and in accordance with the send acknowledgement signal ACK of the asserted state, the data (packet) is transferred together with send designation signal SEND.

The transfer control of such a "handshake" type, where data transfer is performed by confirming that there exists data available for transfer and the transfer data is acceptable, has the transfer timing established asynchronously with a clock signal and is referred to an asynchronous or self-timed transfer control. Hereinafter, a pipeline that performs data (packet) transfer in accordance with this transfer control is referred to as a "self-timed synchronous pipeline".

In the case of the self-timed synchronous pipeline mechanism, even if data flow is temporarily stalled at an arbitrary position within the pipeline, data (packets) will be successively transferred to latch circuits at the stages subsequent (or downstream) to the stopped position, to fill the downstream pipeline stages. Thus, a latch circuit has a kind of a function of buffering the data packets.

It is noted that the pipeline structure of the data transfer paths shown in FIG. 4 only needs to have the self-timed pipeline control mechanism. Any structure other than the one as shown in FIG. 4 as long as self-timed data transfer (handshake type data transfer control) is performed in the FIFO manner.

Figure 6:
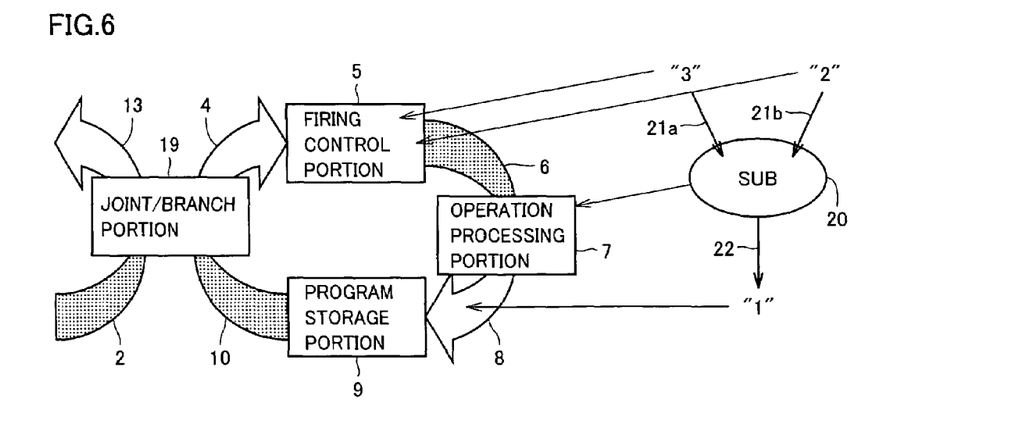
FIG. 6 schematically shows the relation between a flow graph in a data driven processor and a basic configuration of the data driven processor.

FIG. 6 shows the relation between a program to be executed by a data driven processor and a basic construction (processor element) of the data driven processor. In FIG. 6, the construction of data driven processor 1 shown in FIG. 3 and the flow of the data packets are shown, with a subtraction program, as an example, being the program to be executed shown in the right of the figure. In this subtraction program, a code indicating the operation content, i.e., subtraction SUB, is described in a node 20. Input arcs 21*a* and 21*b* with respect to node 20 indicate data to be subjected to the operation, and an output arc 22 shows an output path of the data having undergone the operation. These arcs 21*a*, 21*b* and 22 show the path through which packets including data flow. A set of a plurality of nodes connected via arcs is called a flow graph. A program of a data driven processor is described in a flow graph form.

In FIG. 6, data packets "3" and "2" are transferred via input arcs 21a and 21b, respectively, to node 20, where subtraction SUB is performed on data (3, 2) included in the data packets. The operation result is transferred as a data packet "1" via output arc 22.

Normally, data driven processor 1 includes an input/output control circuit having a function of packetizing input data. A resultant packet has a structure as shown in FIG. 2, where a packet identifier (generation number), an operation content (instruction code), and address information (next node number) determining an operation to be executed next are stored in the corresponding fields. The instruction code indicating the operation content may be read and added from program storage portion 9 by referencing the node number included in node number field NF of FIG. 2. In this case, in data driven processor 1, processor number field PF shown in FIG. 2 is deleted.

The generated packet is taken into joint/branch portion 19 via pipeline data transmission path 2 of the FIFO configuration. Joint portion 3 within joint/branch portion 19 transfers the generated packet via the FIFO pipeline constructing data transmission path 4 to firing control portion 5 where the transferred packet is taken therein. Firing control portion 5 stores the first taken-in packet in an internally provided queuing memory (not shown) as a first packet to be processed.

Then, firing control portion 5 waits for another packet to be processed together with the first packet. In other words, performing the operation is delayed until the firing condition of the first packet is satisfied. Although the example of FIG. 6 indicates a binomial operation, similar queuing is made in the case of trinomial or higher operations. In the case of an operation with a constant, the input packet is fired unconditionally, and the input packet is added with the associated constant and is then transferred as a new packet.

When all the operands necessary for the operation arrive at firing control portion 5, the packets containing the operands are combined into one packet. That is, packets "3" and "2" shown in FIG. 6 are combined to generate a packet. Operand data (3, 2), packet identifier, operation content, and address information for deciding an operation to be executed next are stored in the newly generated packet as shown in FIG. 2, which is transferred to operation processing portion 7 via the FIFO pipeline included in data transmission path 6.

Operation processing portion 7 performs subtraction SUB on the operand data in accordance with the content of the received packet, and stores the operation result back in the original packet, to generate a packet "1", which in turn is transferred via the FIFO pipeline of data transmission path 8 to program storage portion 9.

Program storage portion 9 accesses an internally provided program memory in accordance with the next operation node number (address information) included in the packet received from operation processing portion 7, and stores the instruction code indicating an operation content to be executed next and the next node number indicating a node of the next transfer destination of the data packet in the fields OF and NF shown in FIG. 2, and transfers the resultant packet via the FIFO pipeline of data transmission path 10 to joint/branch portion 19.

In joint/branch portion 19, branch portion 11 shown in FIG. 3 transfers the received packet to either output data transmission path 13 or data transmission path 4, based on the destination information in the received packet.

When packets are being transferred via input arcs 21a and 21b to a single node 20, in firing control portion 5, the packets are transferred in time series via the pipeline. Thus, for a flow graph to be executed in a unit data driven processor (or processor element), the transfer rate (flow rate R(fc)) of the packets input to firing control portion 5 can be calculated from the following expression:

$$R(fc) = \sum_{j=1}^{m} r(j), \tag{1}$$

where j represents an input arc in a flow graph executed by the data driven processor (or processor element), and it is indicated that there exist m input arcs in the equation (1). r(j) represents an input packet rate (packet transfer rate) with respect to the input arc j.

Similarly, the flow rate R(ps) of the packets output from program storage portion 9 can be calculated from the following expression:

$$R(ps) = \sum_{k=1}^{n} r(k), \tag{2}$$

where k represents an output arc of the flow graph executed by the data driven processor (or processor element), and it is indicated that there exist n output arcs in the equation (2). r(k) represents an output packet rate with respect to the output arc k. If the packets flow at a constant rate r for all the arcs, then the flow rate FR(critical) serving as a bottleneck in one processor element can be calculated based on the following expression:

$$FR(\text{critical}) = r \times \text{Max}(m, n) \tag{3},$$

where operation Max (m, n) represents an operational process of selecting a greater one out of m and n.

In the above expression (3), FR(critical) indicates a packet rate (packet input rate) in the basic configuration (which corresponds to the data driven processor shown in FIG. 3 and also to the processor element shown in FIG. 1) of the data driven processor. r represents the transfer rate of the input packets with respect to the flow graph, and indicates specifically the transfer rate of the packets flowing on each of the input and output arcs on the flow graph. m and n represent the number of input arcs and the number of output arcs, respectively, included in the flow graph executed by the processor element. The input and output arcs correspond to input transmission path 2 and output transmission path 13 shown in FIG. 3. In the case where the flow graph is composed of one node 20 as shown in FIG. 6, m is equal to 2, since two input arcs 21a and 21b are present, and n=1, since there is present one output arc 22.

If the flow rate critical value FR(critical) obtained for the input packet rate r from the calculated result of above expression (3) exceeds an upper-limit rate of the processor element or unit data driven processor carrying out the asynchronous pipeline transfer control, then the packets are input at a rate greater than the rate processible in the pipeline, causing an overflow of the pipeline. Here, dynamic performance evaluation where the packet input rate is dynamically changed in accordance with the status of the pipeline is not considered. Rather, static performance evaluation where the input packet rate is constant unchangedly is considered.

It is assumed, for example, that data driven processor DP shown in FIG. 1 has processing performance of 100 MHz, i.e., the packet transfer rate of the pipeline is 100 mega packets/ sec. Further, assume that a program to be executed in the data driven processor is a flow graph represented by a node of two inputs and one output as shown in FIG. 6. In this case, if packets are input to the data driven processor (processor element) at a constant rate of 70 mega packets/sec via respective input arcs 21a and 21b of the flow graph, since the packets are transferred in time series to joint/branch portion 19 of FIG. 6, the packet transfer rate through data transmission path 4 from joint/branch portion 19 to firing control portion 5 comes to 140 mega packets/sec. This exceeds the upper-limit rate of processing performance of the data driven processor (processor element), thereby causing an overflow of the pipeline. In the present invention, presence/absence of such an overflow of the pipeline is evaluated prior to execution of an application program.

Figure 7:
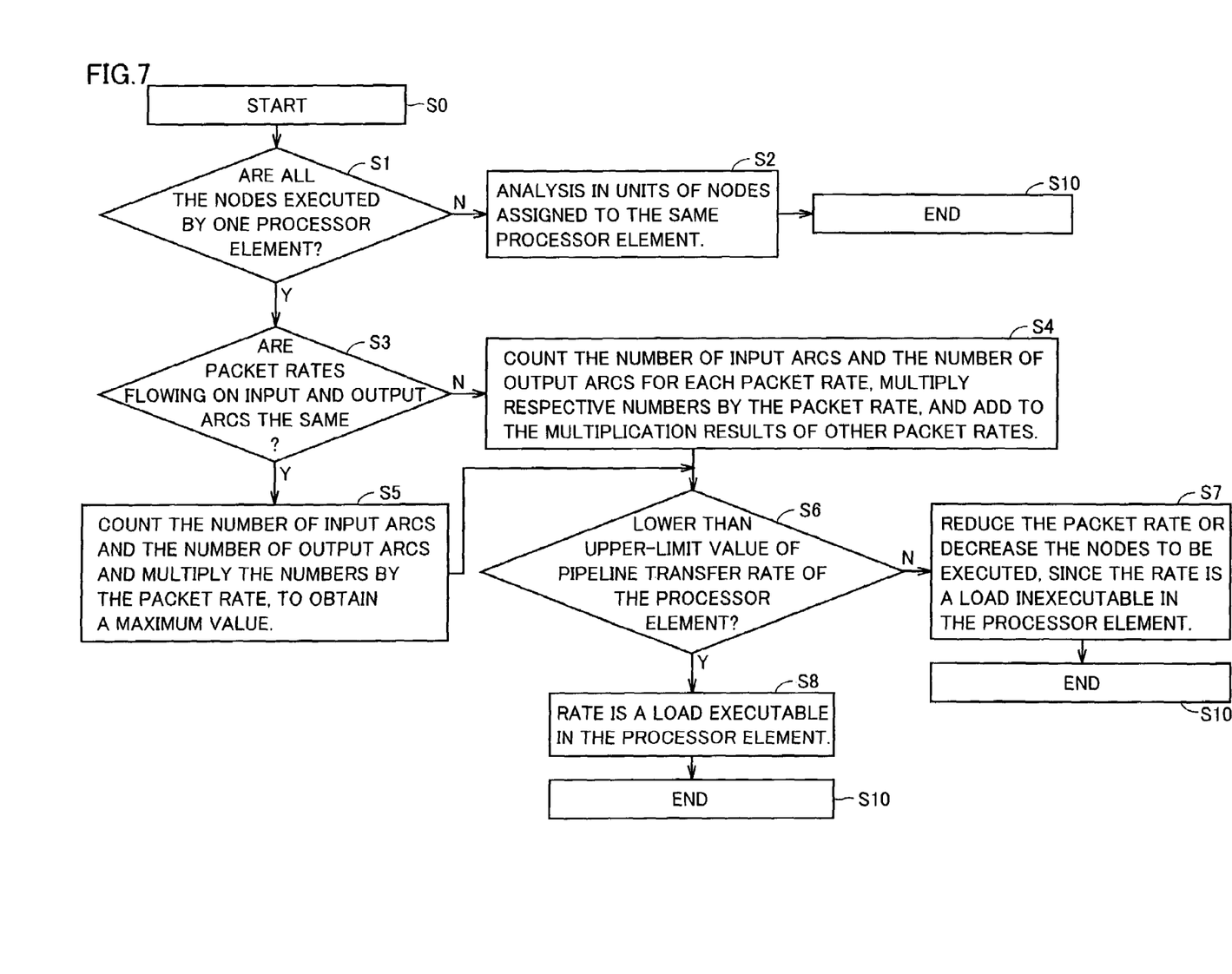
FIG. 7 is a flow diagram representing an operation flow in a performance evaluation method of an application program according to a first embodiment of the present invention.

FIG. 7 is a flow diagram representing operations in a performance evaluation method according to a first embodiment of the present invention. Now, a method for evaluating whether a data driven processor including a plurality of processor elements as shown in FIG. 1 can execute a flow graph in the data driven processor DP will be described with reference to FIG. 7.

First, a flow graph program of an evaluation object is prepared, and a verifying operation is started (step S0). This verifying operation may be executed using a computer or a processing unit on a workstation, or may be executed manually by an operator visually tracking the flow graph program.

Next, it is determined whether all the nodes in the flow graph of the analysis target are to be executed by a common processor element (step S1). If all the nodes are not to be executed by the common processor element, the processing is terminated in step S10 so as to execute a process (step S2) to change the object of analysis such that all the nodes are to be executed by the common processor element. In this case, reference is made to the processor numbers so as to divide the flow graph for each respective processor element, and the processing is restarted from step S0.

If it is determined in step S1 that all the nodes in the flow graph are to be executed by the common processor element, it is verified whether the rates of the packets flowing on the input and output arcs of the flow graph are the same for all the arcs (step S3). If the rates of the packets flowing on the input and output arcs include different rates, the number of input arcs having a common packet rate is multiplied by the associated common packet rate for each different packet rate, and similarly, the number of output arcs the same in packet rate is multiplied by the associated packet rate (packet flowing rate) for each different packet rate, and the results obtained for different packet rates are summed for the input arcs and for the output arcs, respectively. Accordingly, flow rates R(fc) and R(ps) of the above-described expressions (1) and (2) are obtained (step S4).

Specifically, it is assumed that there exist a plurality of flow rates of r1, r2, r3, . . . , the number of input arcs and the number of output arcs on which packets flow at rate r are represented as in1 and out1, respectively, and the number of input arcs and the number of output arcs on which packets flow at rate r2 are represented as in2 and out2, respectively. Then, the process in step S4 can be represented by the following expressions (4) and (5):

$$R(fc) = (r1 \times in1) + (r2 \times in2) + \quad (4)$$

$$R(ps) = (r1 \times out1) + (r2 \times out2) + \quad (5)$$

On the other hand, if it is determined in step S3 that the packet flow rates through the input arcs and the output arcs of the flow graph are the same rate of r, then the number of the input arcs and the number of output arcs are counted, and the larger one of them is multiplied by the constant packet rate r to thereby obtain a maximum value of the packet rate (step S5).

The results obtained in steps S4 and S5 are compared with the pipeline transfer rate of the processor element. If either one of packet flow rate R(fc) for the input arcs and packet flow rate R(ps) for the output arcs is greater than the upper limit of the pipeline transfer rate of the processor element, the packets cannot be processed by the processor element of interest. In this case, the packet rate in the processor element is reduced so as not to exceed the upper limit of the pipeline transfer rate of the processor element, or the number of nodes to be executed is decreased (step S7).

The input and output arcs are those of the flow graph, and correspond respectively to an externally inputted data packet and an externally outputted data packet, viewed from the processor element. By decreasing the number of nodes to be executed, the number of input arcs or output arcs in the flow graph is reduced, and the transfer rate inside the pipeline of the packets inputted to the processor element is reduced.

If the transfer rates (flow rates) for the input and output arcs do not exceed the pipeline transfer rate in the processor element, the transfer rate is determined as a load executable in the processor element (step S8). Determination as to whether it is possible to execute the flow graph is made in steps S7 and S8, and the process proceeds to step S10 to complete the performance evaluation processing.

In the above description, the flow rates are calculated for the output arcs and the input arcs, separately, and they are compared with the packet transfer rate of the processor element. Alternatively, only a larger one of the packet transfer rates (flow rates) of the input arcs and the output arcs may be selected, to be compared with the packet transfer rate of the processor element.

Further, in the above description, performance evaluation is performed for a data driven processor (or processor element) including a plurality of processor elements. The performance evaluation method according to the present invention, however, is applicable to the case where the processor element is used alone, as shown in FIG. 3. In this case, the process of step S2 is merely omitted in the flow diagram of FIG. 7. Inside the processor element, the packets are transferred at the same flow rate, so that it is unnecessary to consider the arcs between the nodes in the flow graph. The flow rates are calculated for the arcs corresponding to an externally input packet and an externally output packet of the processor element (or data driven processor).

It has been described so far that the input and output arcs correspond to the input and output transmission paths. This is because it is considered that an overflow of the pipeline would not occur since the packets are transferred internally at a transfer rate defined at the input arc. However, if the packet transfer rates are defined for the input and output arcs of each node of the flow graph, then the above-described operation may be carried out for each respective node.

Figure 8:
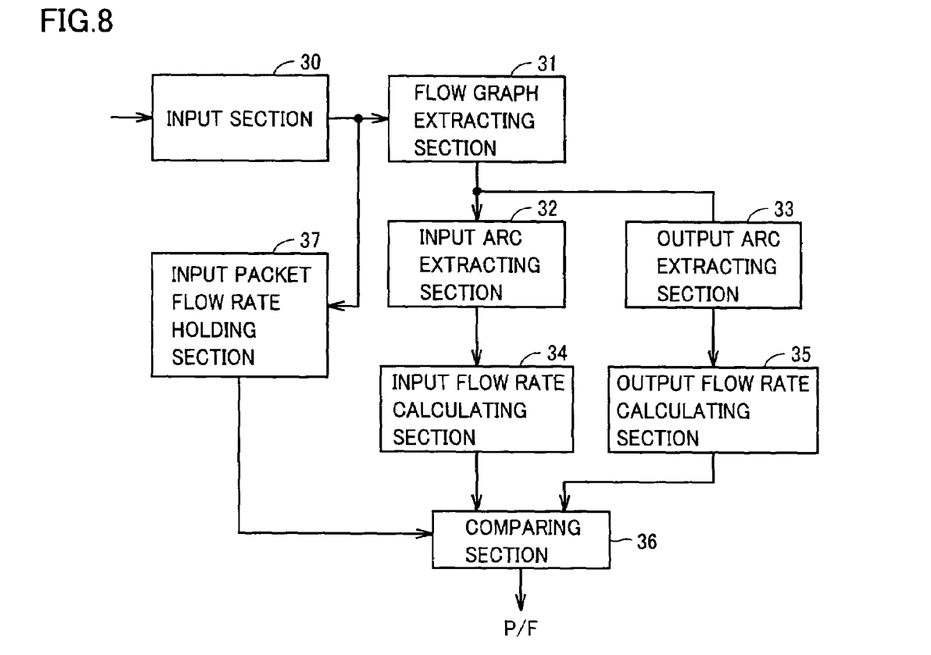
FIG. 8 functionally shows a hardware construction implementing the process flow shown in FIG. 7.

FIG. 8 schematically shows a functional construction of an apparatus for evaluating performance of the flow graph program. In FIG. 8, the performance evaluation apparatus includes an input section 30 that inputs flow graph program information, a flow graph extracting section 31 that extracts a flow graph from the program inputted via input section 30, an input arc extracting section 32 that extracts an input arc from the flow graph extracted by flow graph extracting section 31, an output arc extracting section 33 that extracts an output arc from the flow graph extracted by flow graph extracting section 31, an input flow rate calculating section 34 that calculates an input flow rate based on the input arc information extracted by input arc extracting section 32, an output flow rate calculating section 35 that calculates an output flow rate based on the output arc information extracted by output arc extracting section 33, an input packet flow rate holding section 37 that holds an input packet transfer rate of the processor element or the data driven processor input from input section 30, and a comparing section 36 that compares the flow rates calculated by input flow rate calculating section 34 and output flow rate calculating section 35 with the flow rate held in input packet flow rate holding section 37 and outputs a determination result P/F based on the comparison result.

Input section 30 includes a disk drive unit, a keyboard, a mouse and others, through which necessary information are externally input.

The performance evaluation apparatus shown in FIG. 8 has its functions implemented in an electronic device such as a computer. Flow graph extracting section 31 extracts a flow graph for the processor element from the flow graph program supplied from input section 30, by tracking the connections of the nodes. Input arc extracting section 32 extracts an input arc from the node information of the flow graph, and output arc extracting section 33 extracts an output arc based on the node information of the flow graph. The input and output arcs each have flow rate information added thereto in advance.

Input flow rate calculating section 34 calculates an input flow rate by performing a sum of products operation that includes multiplications of the input arcs extracted by input arc extracting section 32 by the respective packet flow rates and addition of results of the multiplications. Similarly, output flow rate calculating section 35 calculates an output flow rate by performing a sum of products operation of the extracted output arcs and flow rates of the respective output arcs. In each of input flow rate calculating section 34 and output flow rate calculating section 35, the number of arcs having the same flow rate is calculated and the number of the arcs is multiplied by the corresponding flow rate, and the results of multiplications for different flow rates are added together.

Comparing section 36 extracts a greater one of the flow rates obtained by input flow rate calculating section 34 and output flow rate calculating section 35, compares the greater flow rate with the flow rate held in input packet flow rate holding section 37, and sets a determination result P/F, in accordance with the comparison result, to a state indicating whether the program is executable. The determination result may be displayed on a display unit, or may be printed out by a printer or the like.

By using the performance evaluation apparatus shown in FIG. 8 for the flow graph extraction and performance evaluation, it is possible to perform the performance evaluation accurately.

As described above, according to the first embodiment of the present invention, in a data driven processor (or processor element), packet flow rates are calculated for input arcs and output arcs of a flow graph, and the flow rates are compared with a packet transfer rate of the processor element or the data driven processor to determine whether it is possible to execute the flow graph program based on the comparison result. This eliminates the need to use a simulator to execute the program while changing the transfer rate, and achieves simple and easy performance evaluation of a program.

Second Embodiment

Figure 9:
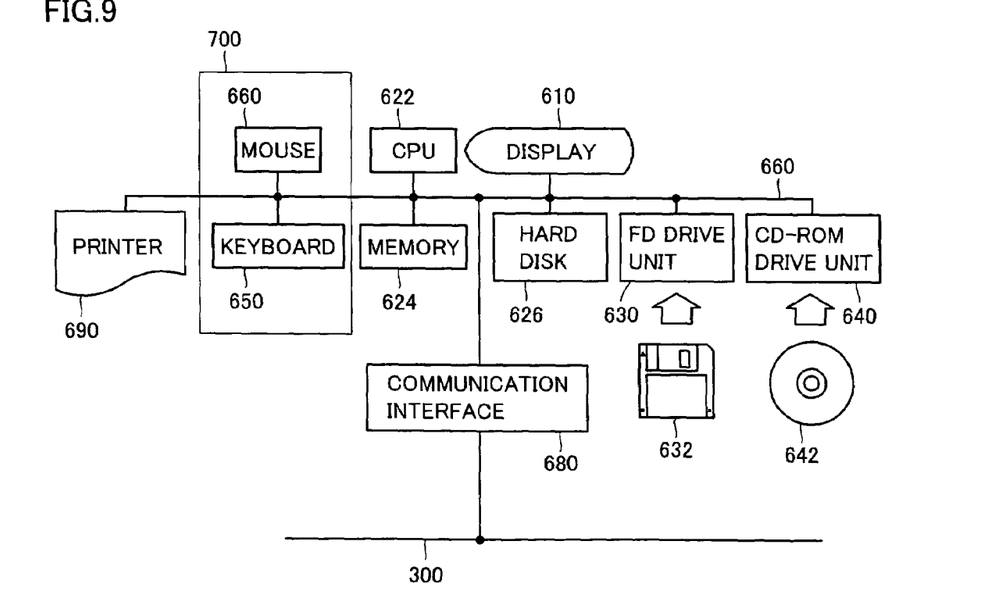
FIG. 9 schematically shows a configuration of a computer in which a static performance evaluation apparatus for an application program according to the present invention is mounted.

Static performance evaluation of an application program can be achieved with high accuracy by executing the performance evaluation processing shown in FIG. 8 on a computer such as a personal computer or a workstation or the like. FIG. 9 schematically shows a construction of a computer in which a static performance evaluation apparatus of an application program according to a second embodiment of the present invention is implemented. In FIG. 9, the computer includes a display unit 610 formed of a CRT (cathode ray tube), a liquid crystal display or the like, a CPU (central processing unit) 622 for centrally managing and controlling the computer, a memory 624 including a ROM (read only memory) or a RAM (random access memory) and storing data for management, program for bootstrapping and others and providing a work area, a hard disk unit 626 storing a large volume of program information or the like in a non-volatile manner, an FD (flexible disk) drive unit 630 fully attachably and detachably loaded with a FD 632 and accessing the loaded FD 632, a CD-ROM (compact disk read only memory) 640 fully attachabley and detachably loaded with a CD-ROM 642 and accessing the loaded CD-ROM 642, a communication interface 680 for connecting the computer to a communication network 300 for communication, an input portion 700 for inputting necessary information/data, and a printer 690 for printing out processing result data.

Input portion 700 includes a mouse 660 having its position changeable on display unit 610 and inputting information through clicking, and a keyboard 650 for inputting information through key press. These components in the computer are connected to each other via an internal bus 660.

The computer may also be provided with a magnetic tape drive unit fully attachably and detachably loaded with a cassette type magnetic tape and accessing the loaded magnetic tape.

In the second embodiment, accuracy in evaluation is improved by acquiring detailed information of the flow graph using an editor tool developed on the computer.

Figure 10:
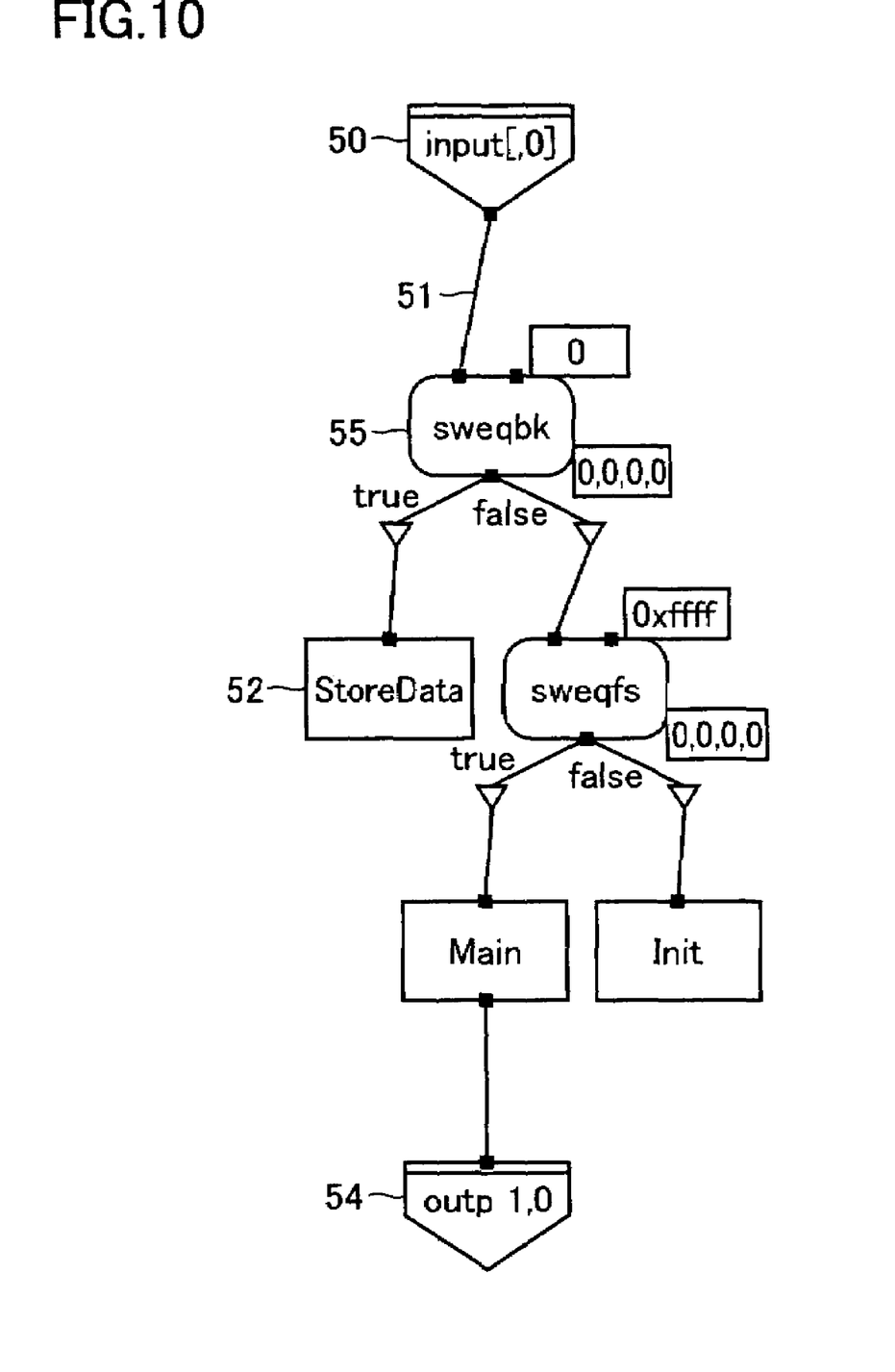
FIG. 10 shows by way of example a flow graph in the case when an application program is implemented as a function in the development environment according to the present invention.

FIG. 10 shows an example of a flow graph described with an editor tool for describing a flow graph. In FIG. 10, the input to the data driven processor (processor element) is declared by description of an input node (input [,0]) 50. A packet rate of the packets inputted to the data driven processor is defined to an arc 51 that extends from the described input node 50. Definition of packet rates to the downstream arcs downstream to arc 51 is not required, since the packets flow on these downstream arcs with the packet rate unchanged.

Arc 51 is coupled to a left input node (port) of a node 55. The right input port of node 55 is coupled to a constant "0". At node 55, when the data supplied to the left input port is smaller than the data on the right input port, the data of the left input port is output to a true node. In the case of false, the data of the left input port is output to a false output node. The true node of node 55 is coupled to a module 52. In module 52, further processing is internally executed. Using module 52 in this flow graph enables hierarchical description of the "Store Data" processing of storing data.

It is possible to describe, in module 52, a plurality of nodes, arcs and a further module, and further possible to nest a plurality of modules therein. In an application program for performing audio signal processing, for example, there is a case where a flow graph of the scale of thousands of nodes is to be described. When modules are used, the flow graph can be divided in units of processes, thereby enabling description of such a large-scale flow graph.

In FIG. 10, modules defined as "Main" and "Init" are used as well. In these modules, programs for executing a main process and an initialization process are described, respectively.

An operation "sweqfs" described in a node connected to the false node of node 55 indicates a process of comparing the sizes of data on a left input node and a right input node and outputting the data of the left input node to either a true output node or a false output node in accordance with the comparison result. Thus, of the data from input node 50, the input data between constant "0" and "0xffff" are processed within the module described as "Main" and the remaining data are subjected to the initialization process in the module described as "Init".

The Main module has its output coupled to an output node 54. Output node 54 corresponds to an output from the data driven processor. Describing the output "outp1,0" in output node 54 declares the output node.

In the flow graph shown in FIG. 10, there is one input node and one output node, and thus, there is one input arc and one output arc. Thus, upon designation of a data packet flow rate to be defined to input arc 51, if the defined rate on input arc 51 does not exceed the packet input rate of the data driven processor, then the flow graph shown in FIG. 10 can be executed in the data driven processor (processor element).

Generally, in a flow graph, a plurality of input nodes and a plurality of output nodes are provided, and operation nodes and modules are connected via arcs between input node 50 and output node 54.

In the second embodiment, when the editor tool is used to describe a flow graph, a packet flow rate is defined to input arc 51, and static performance evaluation of the program is performed based on the packet transfer rate set to the input arc and an upper-limit value of the packet transfer rate within the data driven processor. Specifically, a data rate of input packets is set at the flow graph described using the editor tool as shown in FIG. 10. The performance evaluation function is executed on the editor tool, and performance evaluation processing is effected in accordance with a flow diagram shown in FIG. 11. The performance evaluation result is displayed to a user, using display unit 610 or printer 690. Now, a performance evaluation method according to the second embodiment of the present invention will be described with reference to FIG. 11.

Figure 11:
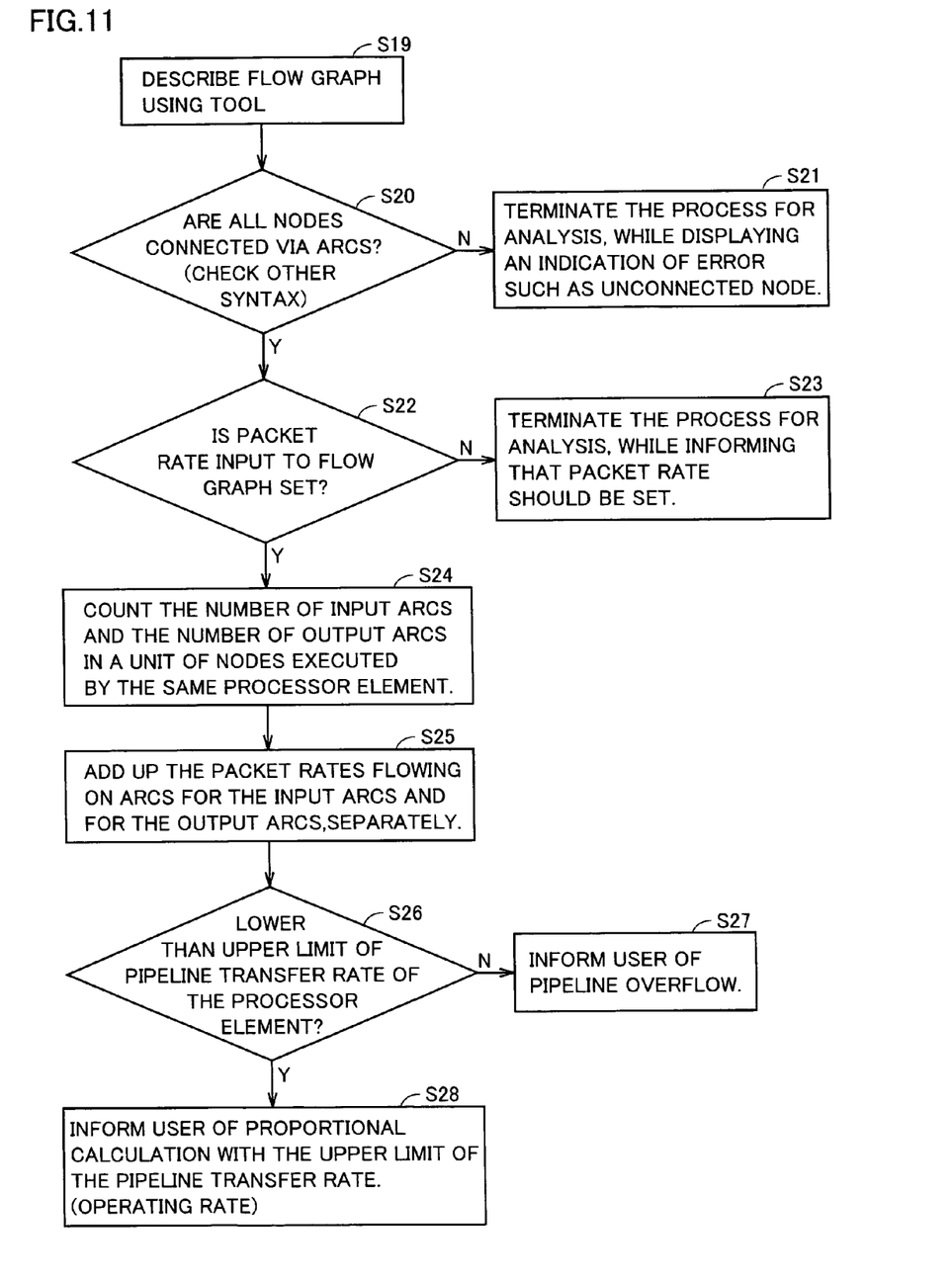
FIG. 11 is a flow diagram representing an operation flow in a performance evaluation method for an application program according to a second embodiment of the present invention.

Firstly, a flow graph is described using an editor tool (step S19). After description of the flow graph, performance evaluation of the described application program is carried out on the editor tool. Therefore, the editor tool supports not only the function of describing a flow graph but also the function of evaluating performance of the described flow graph program.

For the described flow graph, it is firstly determined whether all the nodes are connected via arcs and other syntaxes are described accurately (step S20). When it is determined in step S20 that all the nodes are connected via arcs and the syntaxes are also described accurately, it is then determined whether a packet rate of packets inputted to the flow graph is set (step S22). In these steps S20 and S22, it is detected whether it is possible to analyze the flow graph of the analysis object.

If a defect such as insufficient node connection or syntax failure in the flow graph is detected in step S20, the performance evaluation process is terminated, displaying that there is an error such as an unconnected node (step S21). When the error display is made in step S21, analysis of the unconnected node is performed. If it is determined in step S22 that an input packet rate has not been set to the input arc, then the process is terminated, displaying on display unit 610 that it is necessary to set the input packet rate to the input arc (step S23).

In the case where information required for the performance analysis is short, the analysis process is finished by leaving the process of the presence of an unconnected node and the shortage of required information to step S21 or S23.

If it is determined in step S22 that an input packet rate is set to the flow graph, the editor tool determines that analysis of performance evaluation of the flow graph is possible. In this case, for each of the processor elements, input and output arcs for nodes to be executed are extracted and the numbers of the input arcs and the output arcs are counted. Based on the packet rate information set for the packets flowing through the detected input and output arcs, a total packet rate for the input arcs and a total packet rate for the output arcs are calculated (step S24). In the process of step S24, the process similar to that of the first embodiment is performed. In the process of detecting the input and output arcs, a declared input node and a declared output node are detected, and in addition, the flow rates described for the arcs connected thereto are extracted, to acquire necessary information.

Then, for the input arcs and for the output arcs, packet rates of the packets flowing through the associated arcs are added together (step S25). The calculation of the total packet rate of the packets flowing on the input arcs and the total packet rate of the packets flowing on the output arcs obtained in step S25 is made assuming the case where the packet rates vary among the arcs. In the case where the packet flow rates on the input arcs and the output arcs are all the same, simply, a larger one out of the number of input arcs and the number of output arcs obtained in step S24 is multiplied by the constant flow rate.

Then, it is determined whether the total packet rate thus calculated does not exceed an upper limit of a preset pipeline transfer rate of the processor element (step S26). If the total packet rate exceeds the upper limit of the pipeline transfer rate of the processor element, a user is informed that the pipeline will overflow (step S27). In this case, display is made in the form of dialog box using display unit 610 shown in FIG. 9.

If the total packet rate does not exceed the upper limit of the pipeline transfer rate of the processor element, the comparison value is calculated based on proportional calculation (division), and the upper-limit value and the total packet flow rate are displayed together on display unit 610 shown in FIG. 9 (step S28). By calculating and displaying the ratio between the upper-limit value of the pipeline transfer rate and the total packet flow rate by the proportional calculation, it is further possible to conduct a process to increase the packet transfer rate or increase the number of nodes, based on the analysis result.

The flow shown in FIG. 11 is executed by an editor tool installed on the computer shown in FIG. 9 under the control of CPU 622, to implement the performance evaluation function. By performing the performance evaluation of the flow graph program described using the editor tool, it is possible to extract input and output nodes as well as input and output arcs reliably and with high accuracy (as they can be extracted freely by declaration of the input and output nodes in the editor tool). Accordingly, static performance evaluation of an application program to be executed on a data driven processor (or processor element) based on an asynchronous pipeline transfer control can be carried out with high accuracy and in a short period of time.

Third Embodiment

The process of evaluating static performance of an application program to be executed on an asynchronous pipeline transfer control type processor is implemented by a program. In the third embodiment, this performance evaluation program is stored in a computer readable recording medium. As this recording medium, a memory 624 itself, which is embedded in a computer and is required for executing a processing by the computer, may be a program medium. Alternatively, the program medium may be a recording medium that is removably loaded into an external storage unit of the computer and a program recorded thereon is readable via the external storage unit. The external storage unit may be FD drive unit 630, CD-ROM drive unit 640, as shown in FIG. 9, or a magnetic tape unit (not shown), and the recording medium may be FD 632, CD-ROM 642 or a magnetic tape (not shown).

Whatever recording medium is used, the program recorded on the recording medium may be configured to be accessed and executed by CPU 622 shown in FIG. 9. Alternatively, a performance evaluation program may be temporarily read from a corresponding recording medium and loaded onto a prescribed program storage area, e.g., a program storage area in memory 624, and the stored performance processing program may be read and executed by CPU 622. In this case, it is needless to say that a program for loading the performance evaluation program to a prescribed program area in memory 624 is stored within the computer, in a prescribed area of memory 624 or hard disk 626.

The recording medium for recording the performance evaluation program is configured to be detachable from the main body of the computer. A medium carrying a program in a fixed manner can be used as such a recording medium. Specifically, tapes such as magnetic tape and cassette tape, magnetic disks such as FD 632 and hard disk 626, optic-base disks such as CD-ROM 642, MO (magnetic optical disk), MD (mini disk), and DVD (digital versatile disk), cards such as memory card, IC card and optical card, and semiconductor memories such as mask ROM, EPROM (erasable and programmable ROM), EEPROM (electrically erasable and programmable ROM), and flash memory, may be employed. Thus, as shown in FIG. 12, any kind of recording medium may be used for recording medium 350, as far as it can record performance evaluation program 360.

Further, the computer shown in FIG. 9 is connected to network 300 via communication interface 680. In this case, the performance evaluation program may be downloaded from network 300, and the recording medium may be one carrying the downloaded program. In the case where the performance evaluation program is downloaded from communication network 300, a program for use in downloading may be installed in the computer main body in advance, or may be installed from another recording medium prior to downloading of the performance evaluation program.

In the case where the performance evaluation program is downloaded via communication network 300, a host such as a server carries the performance evaluation program. The contents to be stored in the recording medium is not restricted to the performance evaluation program itself, but may be code data for performing the performance evaluation process, such as code data compiled into a machine language or the like.

Figure 12:
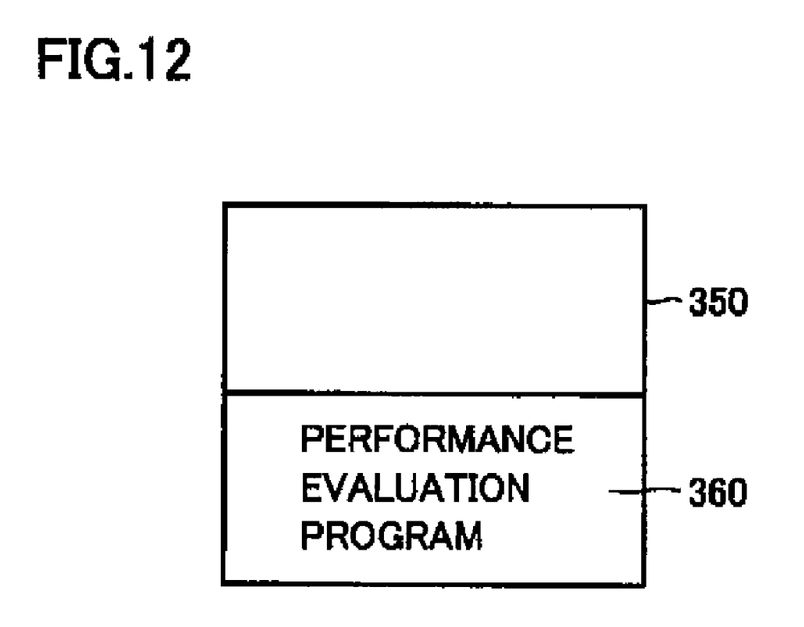
FIG. 12 schematically shows a structure of a recording medium according to a third embodiment of the present invention.

Further, in recording medium 350 shown in FIG. 12, performance evaluation program 360 may be held in a partial area of a program implementing the editor tool.

As described above, according to the third embodiment of the present invention, a recording medium carries the performance evaluation processing program, which enables easy and highly accurate performance evaluation of an application program.

As described above, according to the first through third embodiments of the present invention, flow rates of the packets through the input arcs and the output arcs are calculated by analysis of the flow graph. Thus, it is possible to detect which processor element in the entire configuration of the data driven processor including a plurality of processor elements will constitute a bottleneck in the pipeline transfer, and to calculate a rate at which data can be input in executing a flow graph.

Further, by using a flow graph development environmental tool that implements performance evaluation algorism and analysis function of an application program, it is possible to readily perform performance evaluation of an application program prior to its execution, which was not possible conventionally, and to shorten the application flow graph development period.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for evaluating a performance of a data driven processing unit that includes a firing control portion for detecting and outputting an executable packet and a program storage portion for storing an execution program and transfers packets according to an asynchronous pipeline transfer control, comprising:

an entrancer for entering an execution program in a flow graph format and entering information defining packet transfer rates, respectively, associated with an input arc and an output arc including in said execution program;

an extractor and comparator for extracting the packet transfer rates defined for the input and output arcs included in the flow graph entered by the entrancer together with the number of nodes connected to the respective arcs, and comparing, in magnitude, a larger one of an input packet flow rate to said firing control portion and an output packet flow rate from said program storage portion with a pre-set critical packet transfer rate of the packet transfer rates operable by said data driven processing unit, said input packet transfer rate indicating a total transfer rate of the input packets to the firing control portion and being calculated based on transfer rate information defined on the nodes connected to the input arcs and on the number of the nodes connected to the input arcs, and said output packet transfer rate indicating a total transfer rate of the packets from the program storage portion and being calculated based on the packet transfer rates defined on the nodes connected to the output arcs and on the number of the nodes connected to the output arcs; and an evaluator for evaluating whether an input data rate to said data driven processing device described by said flow graph causes an overflow of the packet in the pipeline, based on information indicating a result of magnitude comparison by said extractor and comparator.

2. A method of evaluating performance, comprising the steps of:

(a) describing, in a flow graph form, a program to be executed by a data driven processing unit transferring a packet according to an asynchronous transfer control, and defining packet transfer rates for an input arc and an output arc included in the flow graph, on a computer using an entrancer for entering information;

(b) operating said computer as an extractor and a comparator, in accordance with the flow graph as described and the packet transfer rates as defined, extracting the packet transfer rates for nodes connected to the input arc and to the output arc, and comparing, magnitude, at least one of a packet input rate and a packet output rate with a pre-set packet transfer rate executable in said data driven processing unit, said input packet transfer rate indicating a total packet transfer rate of the packets on the respective nodes connected to the input arc, and said output packet transfer rate indicating a total transfer rate of the packets on the nodes connected to the output arc; and (c) operating said computer as an evaluator, and evaluating whether an input data rate to said data driven processing unit defined in said flow graph is executable by said data driven processing unit, based on a result of magnitude comparison in the step (b) of comparing.

3. The method of evaluating performance according to claim 2, wherein upon development of a program in a flow graph form using a program development tool, the step (b) is executed for the input and output arcs described in the flow graph program by said computer.

4. A computer readable recording medium for recording a program for causing a computer to execute a performance evaluation method comprising the steps of:

(a) describing, in a flow graph form, a program to be executed by a data driven processing unit transferring a packet in accordance with an asynchronous transfer control, and defining packet transfer rates for an input arc and an output arc included in the flow graph, on a computer using an entrancer for entering information;

(b) operating said computer as an extractor and a comparator, in accordance with the flow graph as described and the packet transfer rates as defined, extracting the packet transfer rates for nodes connected to the input arc and to the output arc, and comparing, in magnitude, at least one of a packet input rate and a packet output rate with a pre-set packet transfer rate executable in said data driven processing unit, said input packet transfer rate indicating a total packet transfer rate of the packets on the respective nodes connected to the input arc, and said output packet transfer rate indicating a total transfer rate of the packets on the nodes connected to the output arc; and (c) operating said computer as an evaluator, and evaluating whether an input data rate to driven processing unit defined in said flow graph is executable by said data driven processing unit, based on a result of magnitude comparison in the step (b) of comparing.

* * * * *